United States Patent
Halahmi et al.

(10) Patent No.: US 7,462,254 B2
(45) Date of Patent: Dec. 9, 2008

(54) WELDING PROCESS AND GEOSYNTHETIC PRODUCTS THEREOF

(75) Inventors: Izhar Halahmi, Hod Hasharon (IL); Oded Erez, Tel Aviv (IL); Adi Erez, Tel Aviv (IL)

(73) Assignee: PRS Mediterranean Ltd. (IL)

( * ) Notice: Subject to any disclaimer, the term of this patent is extended or adjusted under 35 U.S.C. 154(b) by 0 days.

(21) Appl. No.: 11/680,996

(22) Filed: Mar. 1, 2007

(65) Prior Publication Data

US 2008/0210359 A1 Sep. 4, 2008

(51) Int. Cl.
*B32B 37/00* (2006.01)

(52) U.S. Cl. .................. 156/73.1; 156/64

(58) Field of Classification Search ............ 156/64, 156/73.1, 358, 359, 378, 580.1, 580.2
See application file for complete search history.

(56) References Cited

U.S. PATENT DOCUMENTS

| | | | |
|---|---|---|---|
| 5,110,381 A | * | 5/1992 | Heckard et al. ............ 156/64 |
| 5,411,616 A | | 5/1995 | Desai et al. |
| 5,855,706 A | * | 1/1999 | Grewell ................... 156/64 |
| 6,872,460 B2 | | 3/2005 | Murschall et al. |
| 6,953,828 B2 | | 10/2005 | Dharmarajan et al. |

FOREIGN PATENT DOCUMENTS

| | | |
|---|---|---|
| EP | 0378310 A | 7/1990 |
| JP | 56133141 A | 10/1981 |
| RU | 2152479 | 7/2000 |
| RU | 2152480 | 7/2000 |

OTHER PUBLICATIONS

International Search Report.

* cited by examiner

*Primary Examiner*—James Sells
(74) *Attorney, Agent, or Firm*—Richard M. Klein; Fay Sharpe LLP

(57) ABSTRACT

An ultrasonic welding method which requires no external pressure during the welding step is disclosed. A plurality of multi-layer strips can be welded such that the weld area is not thinner than the rest of the strip and has good UV protection. The method comprises: stacking a plurality of strips; providing external pressure; removing the external pressure, positioning the ultrasonic welding apparatus so that it places no external pressure on the stack; welding at least two strips; and removing the welding apparatus.

27 Claims, 1 Drawing Sheet

WELDING PROCESS AND GEOSYNTHETIC PRODUCTS THEREOF

CROSS-REFERENCE TO RELATED APPLICATIONS

This application is related to U.S. patent application Ser. No. 11/680,961, filed Mar. 1, 2007 and entitled "UV RESISTANT MULTILAYERED CELLULAR CONFINEMENT SYSTEM"; to U.S. patent application Ser. No. 11/680,979, filed Mar. 1, 2007 and entitled "GEOTECHNICAL ARTICLES"; to U.S. patent application Ser. No. 11/680,987, filed Mar. 1, 2007 and entitled "HIGH PERFORMANCE GEOSYNTHETIC ARTICLE"; and to U.S. Provisional Patent Application Ser. No. 11/680,961, filed Feb. 29, 2008 and entitled "PROCESS FOR PRODUCING COMPATIBILIZED POLYMER BLENDS". All four of these patent applications are hereby incorporated by reference in their entirety.

BACKGROUND

The present disclosure generally relates to a welding method for multi-layer polymeric or plastic strips. The welding method is particularly useful for geosynthetic products and especially a polymeric cellular confinement system for reinforcing geotechnical materials.

Polymeric or plastic soil reinforcing articles, especially cellular confinement systems (CCSs), are used to increase the load bearing capacity, stability and erosion resistance of geotechnical materials such as soil, rock, sand, stone, peat, clay, concrete, aggregate and earth materials which are supported by said CCSs.

CCSs comprise a plurality of high density polyethylene (HDPE) or medium density polyethylene (MDPE) strips in a characteristic honeycomb-like three-dimensional structure. The strips are attached or welded to each other at discrete locations to achieve this structure. Geotechnical materials can be reinforced and stabilized within or by CCSs. The geotechnical material that is stabilized and reinforced by the said CCS is referred to hereinafter as geotechnical reinforced material (GRM). The surfaces of the CCS are sometimes embossed to increase friction with the GRM and decrease relative movement between the CCS and the GRM.

The term "HDPE" refers hereinafter to a polyethylene characterized by density of greater than 0.940 g/cm³. The term medium density polyethylene (MDPE) refers to a polyethylene characterized by density of greater than 0.925 g/cm³ to 0.940 g/cm³. The term linear low density polyethylene (LLDPE) refers to a polyethylene characterized by density of 0.91 to 0.925 g/cm³.

The polymeric walls of the CCSs may become damaged during service and use in the field by UV light, heat, and humidity (collectively, UHH). The damage results in brittleness, decreased flexibility, toughness, impact and puncture resistance, poor tear resistance, and discoloration. In particular, heat damage to the CCS is significant in hot areas on the globe. As used herein, the term "hot areas" generally refers to areas located 42 degrees latitude on either side of the equator and especially along the desert belt. Hot areas include, for example, North Africa, southern Spain, the Middle East, Arizona, Texas, Louisiana, Florida, Central America, Brazil, most of India, southern China, Australia, and part of Japan. Hot areas are characterized by a combination of temperatures as high as +90° C. on dark surfaces exposed to direct sunlight, and intensive sunlight for periods of up to 14 hours each day.

Some strategies have been applied industrially in order to protect the plastic walls from this damage by treating the polymer making up the plastic walls. For dark colored products, e.g., black or dark gray products, carbon black can be introduced to block UV light and dissipate free radicals. However, one disadvantage produced through the use of carbon black is its aesthetic appearance. Black CCSs are less attractive in applications where the CCS is part of a landscape structure. A second disadvantage is that black CCSs tend to absorb sunlight and heat up. As a consequence, creep can be severely accelerated, especially in the welding points and in thinner wall structures, potentially resulting in structural failures.

CCSs are usually immobilized relative to the GRM by wedges, tendons, or anchors. This immobilization is especially crucial when the CCS is used to reinforce a slope. These anchor points are subjected to severe stress concentrations. Without UHH protection, these anchor points may fail before any significant damage is observed in the rest of the CCS.

Stress is also generated at the welds between the strips making up the CCS. Stress can be applied from compression when trucks drive over the CCS before it is filled with GRM or when GRM is dumped onto the CCS to fill the cells. GRM can also expand when it becomes wet or when water already in the GRM freezes in cold weather. In addition, GRM has a coefficient of thermal expansion (CTE) about 5-10 times lower than the HDPE used to make the strips. Thus, the HDPE will expand much more than the GRM; this causes stress at the welds as well.

Some CCSs are pigmented to shades similar to the GRM they support. These include light colored products and custom-shaded CCSs, such as soil-like colored CCSs, grass-like colored CCSs and peat-like colored CCSs. For these CCSs, special additives (i.e. other than carbon black) are required in order to maintain their properties for periods as long as 20 years. The most effective additives are UV absorbers such as benzotriazoles and benzophenones, radical scavengers such as hindered amine light stabilizers (HALS), and antioxidants. Usually, "packages" of more than one additive are provided to the polymer. The additives are introduced into the polymer, usually as a master batch or holkobatch, a dispersion, and/or solution of the additives in a polymer carrier or a wax carrier.

The amount of additives in the polymer used to make the CCS depends on the life-time required for the CCS. To provide protection for periods of about 5 years, the amount of additives needed is less than if protection for a period of 10 years or more is required. Because additives leach out of the polymer, evaporate, or hydrolyze over time, the actual amount of additives required for protection over a long period of time is about 2 to 10 times greater than the amount that is needed for short term protection needs. In other words, the amount of additives added to the polymer is not a linear function of the time for which protection is desired.

The additives are generally dispersed or otherwise dissolved fairly evenly throughout the entire cross-section of the polymeric strips used to make the CCS. However, most interaction between the additives and the UHH damage-causing agents takes place in the outermost volume, i.e. 10 to 200 microns, of the polymeric strip or film.

U.S. Pat. No. 6,953,828 discloses a membrane, including a geomembrane, stabilized against UV. The patent relates to polypropylene and very low density polyethylene compositions that are effective as membranes, but are not practical for CCSs. Polypropylene is too brittle at sub-zero temperatures. Very low density polyethylene is too weak for use in a CCS because it tends to creep under moderate loads. Once a CCS creeps, the integrity of the CCS and GRM is disrupted and structural performance is irreversibly damaged. In addition, polypropylene requires a large loading of additives to overcome leaching and hydrolysis; this results in an uneconomical polymer.

U.S. Pat. No. 6,872,460 teaches a bi-layer polyester film structure, wherein UV absorbers and stabilizers are introduced into one or two layers. Various grades of polyesters are generally applicable for geo-grids, which are two-dimensional articles used to reinforce soil, such as a matrix of reinforcing tendons. In contrast, CCSs are three-dimensional. Polyesters are generally unsuitable for CCSs due to their stiffness, poor impact and puncture resistance at ambient and especially at sub-zero temperatures, medium to poor hydrolytic resistance (especially when in direct contact with basic media such as concrete and calcined soils), and their overall cost. Again, polyesters require a large loading of additives to overcome leaching and hydrolysis; this results in an uneconomical polymer.

For thin polymeric strips (characterized by a thickness of less than about 500 microns), the amount of additive required generally matches the theoretical calculated required amount. In thicker strips (characterized by thickness of more than about 750 microns—that is usually the case with structural geotechnical reinforcing elements—CCS as example), however, the total amount of additive required is generally higher than the theoretical calculated required amount. For high performance CCSs having thicknesses of about 1.5 mm or more, wherein strength, toughness, flexibility, tear, puncture resistance, and low temperature retention are required, the total amount of additive required is generally 5 to 10 times higher than the theoretical calculated required amount. UHH-protecting additives are very expensive relative to the cost of the polymer. Most manufacturers therefore provide the additives at loadings more closely matching the low (i.e. minimal) theoretical calculated loading level, not the higher loadings required for long-term protection for periods of 50 years and more. Because of this, most manufacturers do not currently guarantee long-term durability of their thick polymeric strips. Current CCSs use HALS and UV absorbers in the amount of 0.1 to 0.25 weight percent dispersed throughout the polymeric strip.

Another aspect related to outdoor durability is the type of polymer used for the CCS. Selection of the correct polymer for this application is a tradeoff between economy, i.e. cost of raw materials, and long-term durability. In this regard, polyethylene (PE) is one of the most popular materials for use, due its balance of cost, strength, flexibility at temperatures as low as minus 60° C., and ease of processing in standard extrusion equipment. Moreover, polyethylene is moderately resistant against UV light and heat. However, without additives, polyethylene is susceptible to degradation within one year to a degree that is unacceptable for commercial use. Even when heavily stabilized, PE is still inferior relatively to more resistant polymers—ethylene-acrylic ester copolymers and terpolymers for example.

On the other hand, polymers that exhibit higher UV and heat resistance, such as acrylic and methacrylic ester copolymers and terpolymers, and specifically ethylene-acrylic ester copolymers and terpolymers, are very suitable to commercial application from the standpoint of UHH resistance. However, their relatively high cost and relatively low modulus and strength characteristics limit their wide-scale use in CCS applications.

A preferred and cost effective method for joining the strips to a CCS, is ultrasonic welding. Ultrasonic welding is suitable for most thermoplastic materials, and is widely used in the automotive, packaging, electronic, and consumer industries. An ultrasonic welding system typically contains a high-frequency power supply (usually 20-40 kHz). The high-frequency energy is directed into a horn (also known as a sonotrode), which is a bar or a metal section dimensioned to be resonant at the applied frequency. The horn contacts the surface of or penetrates into the plastic material which is to be welded and transmits mechanical vibrations into it.

Typically, it is desired to join to plastic parts together. The plastic material should have some means of alignment and a small, uniform initial contact area at the desired joint or interface to concentrate the ultrasonic energy for rapid localized energy dissipation. An energy director, the most commonly used design, consists of a small triangular bead of material at the desired joint or interface area. A combination of applied force, surface friction, and intermolecular friction increases the temperature of the plastic parts until the melting point is reached. The interfaces melt and telescope together, producing a weld in the shear mode. The ultrasonic energy is then removed, leaving a molecular bond or weld between the two plastic parts.

Ultrasonic welding is more efficient in relatively rigid materials and relatively amorphous ones. Usually, high welding frequency is related to low melting rate and lower pressure, as well as more shallow penetration. Ultrasonic welding is very difficult in thin films and is usually applied only to films having a thickness greater than 0.5 mm. Ultrasonic welding is also very difficult relatively soft and low specific gravity polymers, such as polyethylene, that are common materials in geosynthetics, including CCS.

In a simple, monolithic, one-layer, thick-strip based CCS, the welding is provided by ultrasonic means, usually in the range of 15-20 MHz. For example, a method of assembly is described in Russian Patent Nos. 2,152,479 and 2,152,480, wherein pressure and heat are provided to form a joint.

In single-layer strips, it is generally desired to evenly weld the strip throughout its entire cross-section. However, the situation is different in a multi-layer strip. In a multi-layer strip, the welding should be focused in the outer layers for optimal strength and minimal damage to UV protection in the weld area.

Some references provide technology for thin layers ultrasonic welding. U.S. Pat. No. 5,411,616 provides a method for ultrasonic welding of thin plastic films. The method is applicable for an engineering thermoplastic such as polycarbonate, but not for softer plastics such as polyethylene, the most common material in CCS.

It would be desirable to be able to weld a multi-layer plastic strip using ultrasonic means, wherein the welding energy is applied mostly in the outer layer(s) of the strip and does not affect the UV protection of the outer layers.

BRIEF DESCRIPTION

The present disclosure is directed towards an ultrasonic pressure-less method of joining plastic strips together. The method can be used to make geosynthetic products such as a cellular confinement system.

The method comprises:
stacking a plurality of plastic strips to form a stack;
providing external pressure to the stack;
optionally heating the stack to a temperature of at most 120° C.;
removing the pressure from the stack;
positioning an ultrasonic welding apparatus having a sonotrode so that the sonotrode touches the surface of an outermost strip of the stack or penetrates into an outer layer of an outermost strip of the stack at least 5 microns to form a welding zone;

adjusting the sonotrode clamping force so that no pressure is placed on the stack;

welding at least two strips in the stack together by applying ultrasonic energy to the welding zone; and removing the sonotrode from the welding zone.

The ultrasonic welding apparatus may have a welding frequency of at least 15 KHz or at least 40 kHz.

In further embodiments, at least one strip of the plurality of plastic strips is a multi-layer strip.

In other embodiments, an outer layer of the multi-layer strip may comprise UV absorber or heat stabilizer; a pigment or dye; a mineral filler; or a tackifier.

The mineral filler can be selected from metal oxides, metal carbonates, industrial ash, metal sulfates, metal borates, metal phosphates, metal hydroxides, silica and silicates, metals and combinations thereof. The filler comprises from about 5 to about 70 weight percent of the outer layer.

The tackifier can be selected from the group consisting of amorphous poly alpha olefins; styrene base tackifier; phenolic resin tackifier; phenolic-styrene copolymers; rosin based tackifier; tall oil based tackifier; terpene based tackifier; C5 aliphatic hydrocarbon resins; amorphous polypropylene; C9 aromatic resins; dicyclopentadiene cycloaliphatic resins; metallocene polypropylene wax; and combinations thereof.

In further embodiments, the outer layer of the multi-layer strip is embossed, texturized, roughened, or coated with a particulate plastic material. The particulate plastic material may comprise from about 20 to about 99 weight percent polyethylene polymer; up to 60 weight percent filler; and up to 50 weight percent tackifier.

A cellular confinement system comprising a plurality of strips welded according to the disclosed methods is also described. In other embodiments, at least one strip of the plurality of plastic strips is a multi-layer strip.

DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
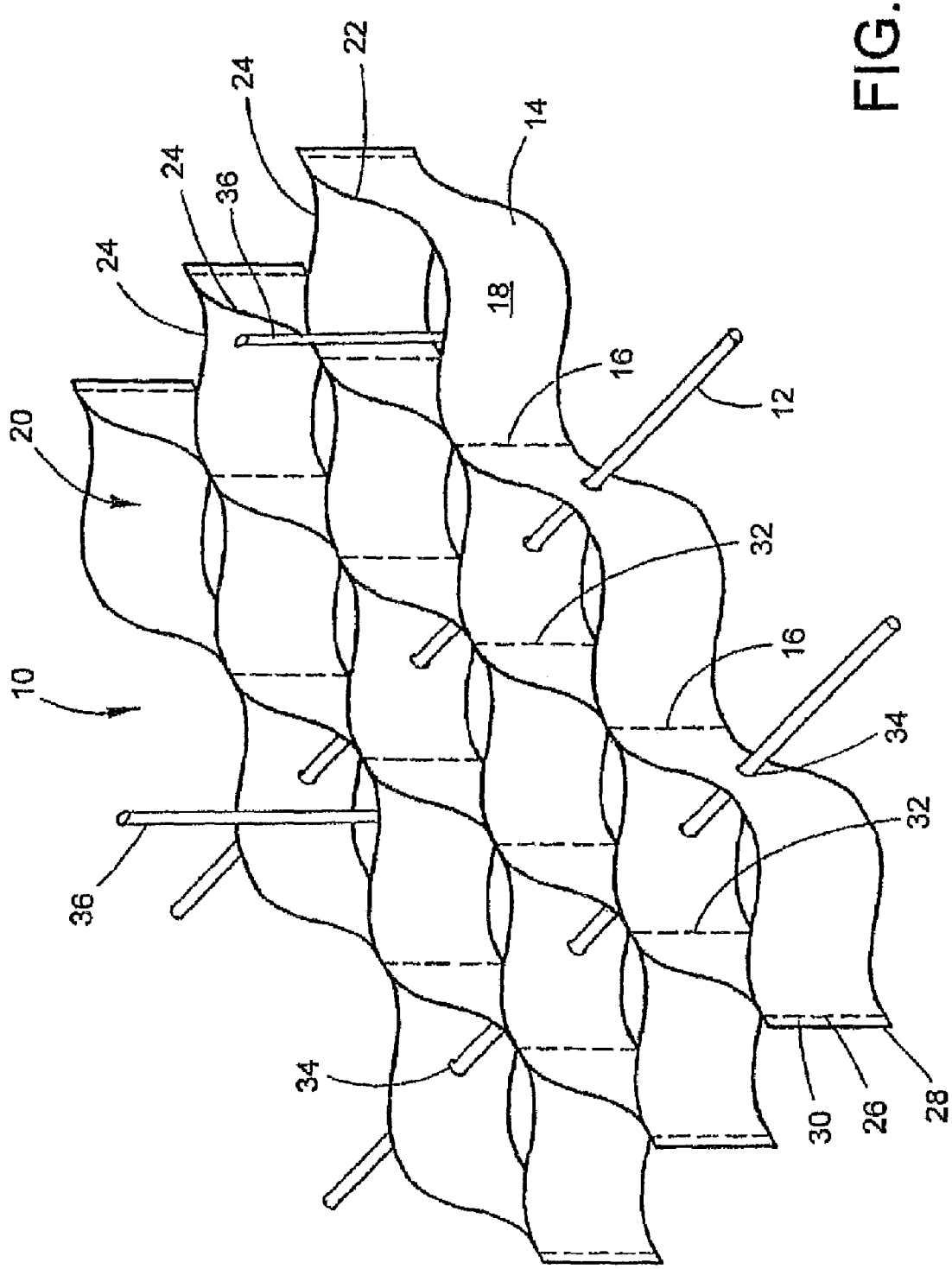
FIG. 1 is a perspective view of a single layer CCS.

All physical properties that are defined hereinafter are measured at 20 to 25 Celsius (° C.) unless otherwise specified.

The following detailed description is provided so as to enable a person of ordinary skill in the art to make and use the embodiments disclosed herein and sets forth the best modes contemplated of carrying out these embodiments. Various modifications, however, will remain apparent to those of ordinary skill in the art and should be considered as being within the scope of this disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

FIG. 1 is a perspective view of a single layer CCS. The CCS 10 comprises a plurality of polymeric strips 14. Adjacent strips are bonded together by discrete physical joints 16. The bonding may be performing by bonding, sewing or welding, but is generally done by welding. The portion of each strip between two joints 16 forms a cell wall 18 of an individual cell 20. Each cell 20 has cell walls made from two different polymeric strips. The strips 14 are bonded together to form a honeycomb pattern from the plurality of strips. For example, outside strip 22 and inside strip 24 are bonded together by physical joints 16 which are regularly spaced along the length of strips 22 and 24. A pair of inside strips 24 is bonded together by physical joints 32. Each joint 32 is between two joints 16. As a result, when the plurality of strips 14 is stretched in a direction perpendicular to the faces of the strips, the strips bend in a sinusoidal manner to form the CCS 10. At the edge of the CCS where the ends of two polymeric strips 22, 24 meet, an end weld 26 (also considered a joint) is made a short distance from the end 28 to form a short tail 30 which stabilizes the two polymeric strips 22, 24.

The CCS 10 can be reinforced and immobilized relative to the ground in at least two different ways. Apertures 34 can be formed in the polymeric strips such that the apertures share a common axis. A tendon 12 can then be extended through the apertures 34. The tendon 12 reinforces the CCS 10 and improves its stability by acting as a continuous, integrated anchoring member that prevents unwanted displacement of the CCS 10. A wedge 36 can also be used to anchor the CCS 10 to the substrate to which it is applied, e.g., to the ground. The wedge 36 is inserted into the substrate to a depth sufficient to provide an anchor. The wedge 36 can have any shape known in the art (i.e., the term "wedge" refers to function, not to shape). The tendon 12 and wedge 36 as shown are simply a section of iron or steel rebar, cut to an appropriate length. They can also be formed of a polymeric material. They can be formed from the same composition as the CCS itself. It may also be useful if the tendon 12 and/or wedge 36 has greater rigidity than the CCS 10. A sufficient number of tendons 12 and/or wedges 36 are used to reinforce/stabilize the CCS 10. It is important to note that tendons and/or wedges should always be placed against the cell wall, not against a weld. Tendons and/or wedges have high loads concentrated in a small area and because welds are relatively weak points in the CCS, placing a tendon or wedge against a weld increases the likelihood that the weld will fail.

The welding method of the present disclosure is suitable for welding and joining plastic strips, especially multi-layer plastic strips for a CCS. The multi-layer plastic strip comprises at least one outer layer and at least one inner layer. The total thickness of the outer layer(s) is about 10% to about 50% of the strip thickness. In some embodiments, the inner layer is about 0.1 to about 5 mm thick. In some embodiments, the outer layer(s) is about 20 to about 600 microns thick.

The outer layer(s) is characterized by improved resistance against UV light, heat, humidity, and combinations thereof. The outer layer(s) comprises a relatively high concentration of light stabilizers, UV absorbers, and optionally pigments, compared to the inner layer(s).

Since the multi-layer plastic strip must retain flexibility, toughness, puncture resistance and tear strength at temperatures at least as low as minus 50° C., and possibly as low as minus 70° C., the polymer composition for the outer layer(s) preferably comprises polyolefins. Particularly preferred polyolefins are medium density polyethylene (MDPE) or mixtures of high density polyethylene (HDPE) and linear low density polyethylene (LLDPE). Their polymer composition may further comprise other polymers selected in a non-limiting manner from ethylene-alpha olefins, polypropylene, ethylene-acrylic ester co-polymers and terpolymer, ethylene-methacrylic ester co-polymers and terpolymer, styrene based elastomers, ethylene-propylene based elastomers, ethylene-vinyl acetate, ethylene-vinyl chloride and engineering thermoplastic resins. In some embodiments, the polymer is selected from polyolefin, polyester, polyamide, styrenic, polycarbonate, polyurethane, acetal and combinations thereof, including blends and alloys.

Since most of the polymers used for geosynthetics and especially for CCS are relatively soft and characterized by relatively low density, it is very difficult to join them by ultrasonic welding, especially wherein thin layers are welded. Applying pressure during welding does not help; the thin outer layer may deteriorate, and as a result the welded area has poor UV protection of the welded area, the weld is weakened, and the weld area has a greater potential for failure during service.

Surprisingly, when a polymer is filled with filler, especially fillers with high specific gravity, the stiffness of the outer layer increases and its bulk density increases, so that ultrasonic welding of a thin layer is enabled. The filler may be selected in a non-limiting manner from mineral fillers, metal oxides, metal carbonates, industrial ash, metal sulfates, metal borates, metal phosphates, metal hydroxides, silica and silicates, metals, and combinations thereof. In particular embodiments, the filler is selected from calcium carbonate, titanium dioxide, barium sulfate, talc, kaolin, clay, zinc oxide, zinc sulfide, silica, silicates, alumina, aluminates, alumosilicates, chalk, dolomite, bentonite, wollastonite, industrial ash and combinations thereof. In specific embodiments, the outer layer comprises from about 5 to about 45 weight percent of mineral filler, based on the weight of the outer layer. In further specific embodiments, the outer layer comprises from about 10 to about 40 weight percent of mineral filler.

The filler may have an average particle size of less than about 30 microns. In further embodiments the filler has an average particle size of less than about 10 microns. In further embodiments, the filler has an average particle size of less than about 5 microns.

The filler may also be surface treated to enhance compatibility with the polymer used in the polymeric layer. In specific embodiments, the surface treatment comprises a sizing agent or coupling agent selected from the group consisting of fatty acids, esters, amides, and salts thereof, silicone containing polymer or oligomer, and organometallic compounds such as titanates, silanes, and zirconates.

In some specific embodiments, the polymer composition for the outer layer(s) comprises a polyethylene polymer and a mineral filler.

The polymer composition for the outer layer(s) may further comprise a tackifier. The introduction of tackifier into the outer layer of the plastic strip improves the tack between adjacent strips. The tackifier may be selected in a non-limiting manner from amorphous poly alpha olefins; styrene base tackifier; phenolic resin tackifier; phenolic-styrene copolymers; rosin based tackifier; tall oil based tackifier; terpene based tackifier; C5 aliphatic hydrocarbon resins; amorphous polypropylene; C9 aromatic resins; dicyclopentadiene cycloaliphatic resins; metallocene polypropylene wax; and combinations thereof. In specific embodiments, the polymer composition is obtained by mixing polymer, mineral filler, and optionally tackifier. In other specific embodiments, the polymer composition is obtained by mixing polymer, tackifier, and optionally mineral filler.

The polymer composition for the outer layer(s) may comprise a UV absorber. In particular embodiments, the UV absorber is organic and is a benzotriazole or a benzophenone commercially available as, for example, Tinuvin™, manufactured by Ciba, and Cyasorb™, manufactured by Cytec. The composition may also comprise a hindered amine light stabilizer (HALS) alone or with the UV absorber. HALS are molecules which provide long term protection against free radicals and light-initiated degradation. In particular, HALS do not contain phenolic groups. Their limiting factor is the rate at which they leach out or are hydrolyzed. The organic UV absorber and HALS together are present in the amount of from about 0.01 to about 2.5 weight percent, based on the total weight of the layer.

The polymer composition for the outer layer(s) may also comprise an inorganic UV absorber. In particular embodiments, the UV absorber has the form of solid particles. Solid particles are characterized by negligible solubility in polymer and water and negligible volatility, and thus do not tend to migrate out or be extracted from the layer(s). The particles may be micro-particles, (e.g. from about 1 to about 50 micrometers in average diameter), sub-micron particles (e.g. from about 100 to about 1000 nanometers in average diameter), or nanoparticles (e.g. from about 5 to about 100 nanometers in average diameter). In specific embodiments, the UV absorber comprises inorganic UV-absorbing solid nanoparticles. Unlike organic UV absorbers that are soluble in polymer and have mobility even at high molecular weights, inorganic UV absorbers have practically no mobility and are therefore very resistant against leaching and/or evaporation. UV-absorbing solid nanoparticles are also transparent in the visible spectrum and are distributed very evenly. Therefore, they provide protection without any contribution to the color or shade of the polymer. Solid particles are also very insoluble in water, improving the durability of the polymer. In particular embodiments, the UV-absorbing nanoparticles comprise a material selected from the group consisting of titanium salts, titanium oxides, zinc oxides, zinc halides, and zinc salts. In particular embodiments, the UV-absorbing nanoparticles are titanium dioxide. Examples of commercially available UV-absorbing particles are SACHTLEBEN™ Hombitec RM 130F TN, by Sachtleben, ZANO™ zinc oxide by Umicore, NanoZ™ zinc oxide by Advanced Nanotechnology Limited and AdNano Zinc Oxide™ by Degussa. UV-absorbing particles may be present in a loading of from about 0.01 to about 85 weight percent, by weight of the layer. In more specific embodiments, inorganic UV-absorbing particles have a loading of from about 0.1 to about 50 weight percent, based on the total weight of the polymer layer. In a specific embodiment, the polymeric layer comprises an inorganic UV absorber, HALS, and an optional organic UV absorber.

The polymer composition for the outer layer(s) may further comprise a pigment or dye. Any suitable pigment or dye may be used which does not significantly adversely affect the desired properties of the polymer composition. In specific embodiments, the pigment is selected so that the color of the polymer composition is about the color of the GRM. Generally, the color is other than black or dark gray, especially any color which is not in the gray scale. The colored polymeric layer need not be a uniform color; patterns of color (such as camouflage) are also contemplated. In specific embodiments, the polymer composition may have a vivid color, such as red, yellow, green, blue, or mixtures thereof, and mixtures thereof with white or black, as described by CIELAB color coordinates. A preferred group of colors and shades are brown (soil-like), yellow (sand-like), brown and gray (peat-like), off-white (aggregate like), light gray (concrete-like), green (grass-like), and a multi-color look which is stained, spotted, grained, dotted or marble-like. Such colors have the utilitarian feature of allowing the CCS to be used in applications where the CCS is visible (i.e. not buried or covered by fill material). For example, the CCS can be used in terraces where the outer layers are visible, but can be colored to blend in with the environment. In further particular embodiments, the polymeric strip contains a pigment or dye, but does not contain carbon black. Generally, for purposes of this application, carbon black is considered a UV absorber rather than a pigment.

Certain polymer compositions provide improved weldability as a thin layer, especially when used as the outer layer in a multi-layer geosynthetic strip. In one specific embodiment, the polymer composition has a 1% secant flexural modulus according to ASTM D790 of at least 750 MPa and a density of at least 0.95 g/cm$^3$. The polymer composition may also have a 1% secant flexural modulus of at least 1200 MPa or at least 1400 MPa. The polymer composition may also have a density of at least 1.1 g/cm$^3$ or at least 1.20 g/cm$^3$.

In another embodiment, the polymer composition has a 1% secant flexural modulus according to ASTM D790 of at least 650 MPa and a density of at least 0.90 g/cm$^3$. The polymer composition may also have a 1% secant flexural modulus of at least 850 MPa or at least 950 MPa. The polymer composition may also have a density of at least 0.93 g/cm$^3$.

When extruded as a thin outer layer, these polymer compositions have improved tack in a temperature range of about 25 to about 120° C. under external pressures of up to 3 MPa.

In another embodiment, the polymer composition comprises up to 95 weight percent of at least one polyethylene; up to 60 weight percent of mineral filler; and up to 30 weight percent of tackifier.

Polymer compositions as described herein can be made by melt kneading at least one polymer with at least one additive in an extruder. Filler or other additive may be added to the extruder for form a polymer mixture. The mixture is then pumped downstream to form a strip.

Multi-layer plastic strips with outer layer(s) of the polymeric compositions described above are suitable for the welding method of the present disclosure. In particular, a method of welding a plurality of multi-layer plastic strips is disclosed, wherein the plastic strips are stacked in a parallel manner. The method comprises joining predetermined portions of the strips together by ultrasonic welding, wherein the welding is done with no external pressure on the strips and the welding does not affect the UV protection of the outer layer(s) of the strips. The process of welding with no external pressure is hereinafter referred to as PLUW.

No external pressure on the strips is needed because of the increased weldability of the polymer composition. External pressure is the main cause for a thinner cross-section in the welding area which forms the joint or interface between two strips. The thinner cross-section causes the weld to be weaker and lowers the amount of UV protection at the joint. This increases the potential for failure of the weld during use of the CCS. As discussed above, introducing mineral filler into the polymer composition increases its bulk density and modulus so that ultrasonic welding can be performed without additional external pressure on the strips.

In embodiments, the ultrasonic welding method of the present disclosure comprises the following steps:
  stacking a plurality of multi-layer strips to form a stack;
  providing external pressure to the stack;
  optionally heating the stack to a temperature of at most 120° C.;
  removing the pressure from the stack;
  positioning an ultrasonic welding apparatus having a sonotrode so that the sonotrode touches the surface of an outermost strip of the stack or penetrates into an outer layer of an outermost strip of the stack at least 5 microns to form a welding zone;
  adjusting the sonotrode clamping force so that no pressure is placed on the stack;
  welding at least two strips in the stack together by applying ultrasonic energy to the welding zone; and
  removing the sonotrode from the welding zone.

A low external pressure on the stack is recommended during the stacking step. The pressure should be in the range of from 0.01 to about 10 MPa. The pressure may also be in the range of from 0.05 to about 5 MPa or from 0.05 to about 2 MPa.

The stack may be left at ambient temperature. It can also be heated to a temperature range of from about 40° C. to about 70° C. or from about 70° C. to at most 120° C.

After the stacking step, providing pressure step, and optional heating step are performed, a sonotrode is placed so that it touches the outer surface of the stack or penetrates some microns into the outermost strip. The amount of penetration depends on the stack thickness and is calculated to focus welding energy in about the center of the outer layer. In specific embodiments, the sonotrode may penetrate up to 25 microns into the outer layer of the outermost strip.

The ultrasonic welding may occur at frequencies of from about 15 KHz to about 70 KHz. When the welding is performed, no external pressure is applied and the welding occurs for a period of time until the plastic is molten along the cross-section of the stack.

In specific embodiments, the ultrasonic method comprises stacking a plurality of multi-layer strips and providing pressure in the range of 0.01-5 MPa. The pressure is released and the stack is welded by pressure-less ultrasonic welding at a frequency of at least 20 KHz. In particular embodiments, the ultrasonic welding is performed at a frequency of at least 40 KHz and in particular from at least 20 kHz to about 70 kHz.

Ultrasonic welding of thin layers is also sensitive to surface topography. Because the wavelength of the sound wave shortens as the frequency increases, surface roughness may serve as an "energy concentrating" feature. Surprisingly, when the surface of the said strips is embossed, texturized or even slightly roughened, a welding is obtained without need to apply pressure during the ultrasonic welding step. The efficiency of the pressure-less welding process is improved when the outer surface of the strip is rough or texturized. In some embodiments, the surface topography of the outer layer(s) of the outermost strip is embossed, texturized, or roughened, so that the ultrasonic welding is more efficient compared to a smooth surface.

The roughness of the surface can be obtained by roughening the chilling rolls downstream from the extruder or by a secondary tool located downstream during the manufacture of the multi-layer strips. The surface can also be roughened by controlled bonding or attaching of a low-melting polymeric compound powder onto the surface of the outer layer(s). In one specific embodiment, the multi-layer plastic strips of the present disclosure are embossed by diamond-type structures located near the chilling rolls. Embossed strips provide excellent welding quality when welded by an ultrasonic horn at from about 15 kHz to about 40 KHz of from about 40 kHz to about 70 KHz, wherein no external pressure is applied during welding.

In one specific embodiment, the multi-layer plastic strips of the present disclosure are coated by a powder comprising from about 20 to about 99 weight percent polyethylene polymer; up to 60 weight percent filler; and up to 50 weight percent tackifier. The average powder particle size is from about 5 to about 500 microns. Such strips provide excellent welding quality when welded by an ultrasonic horn of at least 15 KHz, including at least 40 KHz, wherein no external pressure is applied during welding.

The ultrasonic welding method of the present disclosure can be used to form a CCS comprising a plurality of multi-layer strips. The multi-layer strip may have three layers and be manufactured by co-extrusion. The core layer comprises up to 100% MDPE or HDPE; up to 50% LLDPE; and up to 30% mineral filler. The two outer layers comprise up to 100% MDPE or HDPE; 0.05 to about 3 weight percent of additives selected in a non-limiting manner from UV absorbers, hindered amine light stabilizers (HALS), pigments, and dyes; up to 60% mineral filler; and up to 30% tackifier. The multi-layer strips have a thickness in the range of from about 0.7 to about 2 mm, wherein the outer layers are from about 100 to about 500 microns thick. The strips are welded together using an ultrasonic welding horn which penetrates into the outer layer about 20 to about 50 microns, no mechanical pressure is applied during welding, and the welding frequency is from about 20 to about 70 KHz.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

A CCS comprising a plurality of multi-layer strips is provided. The multi-layer strip in this embodiment is a three layer strip and is manufactured by co-extrusion. The core layer comprises medium density polyethylene (MDPE) grade Marlex™ K306 manufactured by Chevron-Phillips and is co-extruded with two outer layers. Each outer layer comprises 67.9% Marlex™ K306 manufactured by Chevron-Phillips; 0.8% UV-3808 light stabilizer manufactured by CYTEC; 1% Titanium Dioxide pigment KRONOS 2220 manufactured by Kronos; 0.3% brown pigment Cromophtal Red A3B, manufactured by CIBA; 22% calcium carbonate having average particle size lower than 10 microns as a mineral filler; and 8% Escorez™ 5000 tackifying resin, manufactured by Exxon Mobil. The strips manufactured have a thickness in the range of about 1.2 to 1.5 mm, wherein the outer layers are about 300 to 500 microns thick. The strips are stacked and pressed at 85° C. under pressure of 3 MPa for 1 minute. After removal of pressure and heat, the strips are welded by an ultrasonic welding horn at 20 KHz, wherein the horn penetrates into the outer layer about 20 to 50 microns.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for the ultrasonic pressure-less welding of a plurality of plastic strips, comprising:
   stacking the plurality of plastic strips to form a stack;
   providing external pressure to the stack;
   optionally heating the stack to a temperature of at most 120° C.
   removing the pressure from the stack;
   positioning an ultrasonic welding apparatus having a sonotrode so that the sonotrode touches the surface of an outermost strip of the stack or penetrates into an outer layer of an outermost strip of the stack at least 5 microns to form a welding zone;
   adjusting the sonotrode clamping force so that no pressure is placed on the stack;
   welding at least two strips in the stack together by applying ultrasonic energy to the welding zone; and
   removing the sonotrode from the welding zone.

2. The method of claim 1, wherein the ultrasonic welding apparatus has a welding frequency of at least 15 KHz.

3. The method of claim 1, wherein the ultrasonic welding apparatus has a welding frequency of at least 40 KHz.

4. The method of claim 1, wherein at least one strip of the plurality of plastic strips is a multi-layer strip.

5. The method of claim 4, wherein an outer layer of the multi-layer strip comprises a UV absorber or heat stabilizer.

6. The method of claim 4, wherein an outer layer of the multi-layer strip comprises a pigment or dye.

7. The method of claim 4, wherein an outer layer of the multi-layer strip comprises a mineral filler.

8. The method of claim 7, wherein the mineral filler is selected from metal oxides, metal carbonates, industrial ash, metal sulfates, metal borates, metal phosphates, metal hydroxides, silica and silicates, metals and combinations thereof.

9. The method of claim 7, wherein the filler comprises from about 5 to about 70 weight percent of the outer layer.

10. The method of claim 4, wherein an outer layer of the multi-layer strip comprises a tackifier.

11. The method of claim 10, wherein the tackifier is selected from the group consisting of amorphous poly alpha olefins; styrene base tackifier; phenolic resin tackifier; phenolic-styrene copolymers; rosin based tackifier; tall oil based tackifier; terpene based tackifier; C5 aliphatic hydrocarbon resins; amorphous polypropylene; C9 aromatic resins; dicyclopentadiene cycloaliphatic resins; metallocene polypropylene wax; and combinations thereof.

12. The method of claim 4, wherein an outer layer of the multi-layer strip is embossed, texturized, roughened, or coated with a particulate plastic material.

13. The method of claim 4, wherein the particulate plastic material comprises from about 20 to about 99 weight percent polyethylene polymer; up to 60 weight percent filler; and up to 50 weight percent tackifier.

14. The method of claim 8, wherein the filler comprises from about 5 to about 70 weight percent of the outer layer.

15. The method of claim 5, wherein the outer layer of the multi-layer strip further comprises a tackifier.

16. The method of claim 6, wherein the outer layer of the multi-layer strip further comprises a tackifier.

17. The method of claim 7, wherein the outer layer of the multi-layer strip further comprises a tackifier.

18. The method of claim 8, wherein the outer layer of the multi-layer strip further comprises a tackifier.

19. The method of claim 9, wherein the outer layer of the multi-layer strip further comprises a tackifier.

20. The method of claim 5, wherein the outer layer of the multi-layer strip is embossed, texturized, roughened, or coated with a particulate plastic material.

21. The method of claim 6, wherein the outer layer of the multi-layer strip is embossed, texturized, roughened, or coated with a particulate plastic material.

22. The method of claim 7, wherein the outer layer of the multi-layer strip is embossed, texturized, roughened, or coated with a particulate plastic material.

23. The method of claim 8, wherein the outer layer of the multi-layer strip is embossed, texturized, roughened, or coated with a particulate plastic material.

24. The method of claim 9, wherein the outer layer of the multi-layer strip is embossed, texturized, roughened, or coated with a particulate plastic material.

25. The method of claim 10, wherein the outer layer of the multi-layer strip is embossed, texturized, roughened, or coated with a particulate plastic material.

26. The method of claim 11, wherein the outer layer of the multi-layer strip is embossed, texturized, roughened, or coated with a particulate plastic material.

27. A method for welding together the outer layer of two multi-layer plastic strips, comprising:

provinding a first and a second multi-layer plastic strip, each plastic strip comprising a first outer layer, an inner layer, and a second outer layer;

stacking the two plastic strips to form a stack such that an outer layer of the first strip contacts an outer layer of the second strip;

providing external pressure to the stack;

optionally heating the stack to a temperature of at most 120° C.;

removing the external pressure from the stack;

positioning an ultrasonic welding apparatus having a sonotrode so that the sonotrode touches the surface of the stack or penetrates into an outer layer of one strip at least 5 microns to form a welding zone;

adjusting the sonotrode clamping force so that no pressure is placed on the stack;

applying ultrasonic energy to the welding zone to weld together the outer layer of the first strip and the outer layer of the second strip that are in contact with each other; and removing the sonotrode from the welding zone.

* * * * *